United States Patent [19]

Miki et al.

[11] Patent Number: 4,569,603
[45] Date of Patent: * Feb. 11, 1986

[54] MOUNTING DEVICE FOR ANTIFRICTION BEARING

[75] Inventors: Toshio Miki, Osaka; Yoshihide Toda, Toyota; Kenichi Horii, Okazaki, all of Japan

[73] Assignee: Koyo Seiko Company Limited, Osaka, Japan

[*] Notice: The portion of the term of this patent subsequent to Jun. 11, 2002 has been disclaimed.

[21] Appl. No.: 669,652

[22] Filed: Nov. 6, 1984

Related U.S. Application Data

[62] Division of Ser. No. 536,442, Sep. 27, 1983.

[30] Foreign Application Priority Data

[JP] Japan ...................................

[51] Int. Cl.$^4$ ............................................. F16C 35/077
[52] U.S. Cl. ................................................... 384/585
[58] Field of Search ............... 384/571, 569, 539, 585, 384/584, 581, 903; 308/DIG. 11

[56] References Cited

U.S. PATENT DOCUMENTS

| | | | |
|---|---|---|---|
| 2,136,125 | 11/1938 | Delaval-Crow | 384/539 |
| 2,607,642 | 8/1952 | Gilbert | 384/539 |
| 2,650,866 | 9/1953 | Knudson | 384/539 |
| 3,803,873 | 4/1974 | Goller | 384/585 |
| 4,058,157 | 11/1977 | Weigard | 384/581 |

Primary Examiner—Lenard A. Footland
Attorney, Agent, or Firm—Mason, Fenwick & Lawrence

[57] ABSTRACT

A circumferential groove is provided in the inner periphery of a bearing housing so as to be opposed to a circumferential groove provided in the outer periphery off the raceway of an outer race.

The elastic tie bar is fixed in the circumferential grooves opposed to each other, astriding both, and the bearing is mounted in the housing, its position fixed thereby.

An opening is provided in part of the circumferential groove in the outer race to communicate with the bearing interior, and through this opening an end of the tie bar is revealed in the bearing interior.

4 Claims, 7 Drawing Figures

MOUNTING DEVICE FOR ANTIFRICTION BEARING

CROSS-REFERENCE TO RELATED APPLICATION

This application is a division of earlier applications Ser. No. 06/536,442 filed on Sept. 27, 1983.

BACKGROUND OF THE INVENTION

The present invention relates to a device for mounting antifriction bearings in place.

Most common of the conventional methods of mounting antifriction bearings consists in first setting the outer race of the bearing in the bore provided in the housing of a machine, then bringing one end of the outer race into contact with the peripherally stepped portion formed on the inner periphery of the housing's bore and stopping the other end thereof with a stopper ring set in the inner periphery of the housing's bore to thereby prevent displacement thereof along axial direction with respect to the bearing.

This method, however, is troublesome in that machining is required for forming the peripherally stepped portion in the inner periphery of the housing and also for providing an inner circumferential groove for fixing the stopper ring. Moreover, the method necessitates designing of the housing bore with allowance in length and thickness for accommodating the stopper ring/s at one or both ends thereof taken into due consideration.

INFORMATION DISCLOSURE STATEMENT

List

U.S. Pat. No. 4,054,999 of Oct. 25, 1977. Inventor: William E. Harbottle

A typical embodiment of the bearing mounting device disclosed therein is shown in FIG. 10 thereof. Both ends of an outer race 120 of the double cup type having symmetrical tapered raceways 10 set in a housing's bore are checked against displacement by snap rings 126 fitted in circumferential grooves 128 formed in the inner periphery of the aforementioned bore 124.

The aforementioned circumferential grooves 128 are required to be pretty strong so as to ensure against axial displacement of the bearing's outer race 120 in the bore by means of the snap rings 126 and also to withstand the shaft thrust applied to the bearing. The body of the housing is, therefore, required to be sufficiently longer than the bearing's outer race, hence it is difficult to reduce the size of the housing.

In case of a bearing with its outer race designed as a double cup thinner at both ends, on the other hand, the condition is such that the inner diameter of the snap ring is smaller than the inner diameter of both ends of the outer race, and the bearing's rollers interfere with the inner periphery of the snap ring to obstruct smooth rotation of the bearing.

SUMMARY OF THE INVENTION

It is, therefore, the object of the present invention to provide a mounting device for antifriction bearings under elimination of the aforementioned shortcomings of the prior art.

The present invention is characterized in that a fixing means engaging in grooves for fixing provided in the outer periphery of the outer race of the bearing off its raceway as well as the housing's bore in mutually opposing relation is provided for mounting the bearing in the bore of the housing, and this fixing means is made to be accessible from inside the outer race for the mounted bearing to be easily demountable thereby from inside the bore of the housing.

According to the present invention, the mechanism for mounting the bearing is simplified and the size of the housing can be reduced rationally. Also it provides for, for instance, double row taper roller bearing with the ends of its outer race thin a device enabling mounting thereof safely in a housing without interfering with the bearing's operation as well as function.

DETAILED DESCRIPTION OF THE PREFERRED EMBODIMENTS

Figure 1:
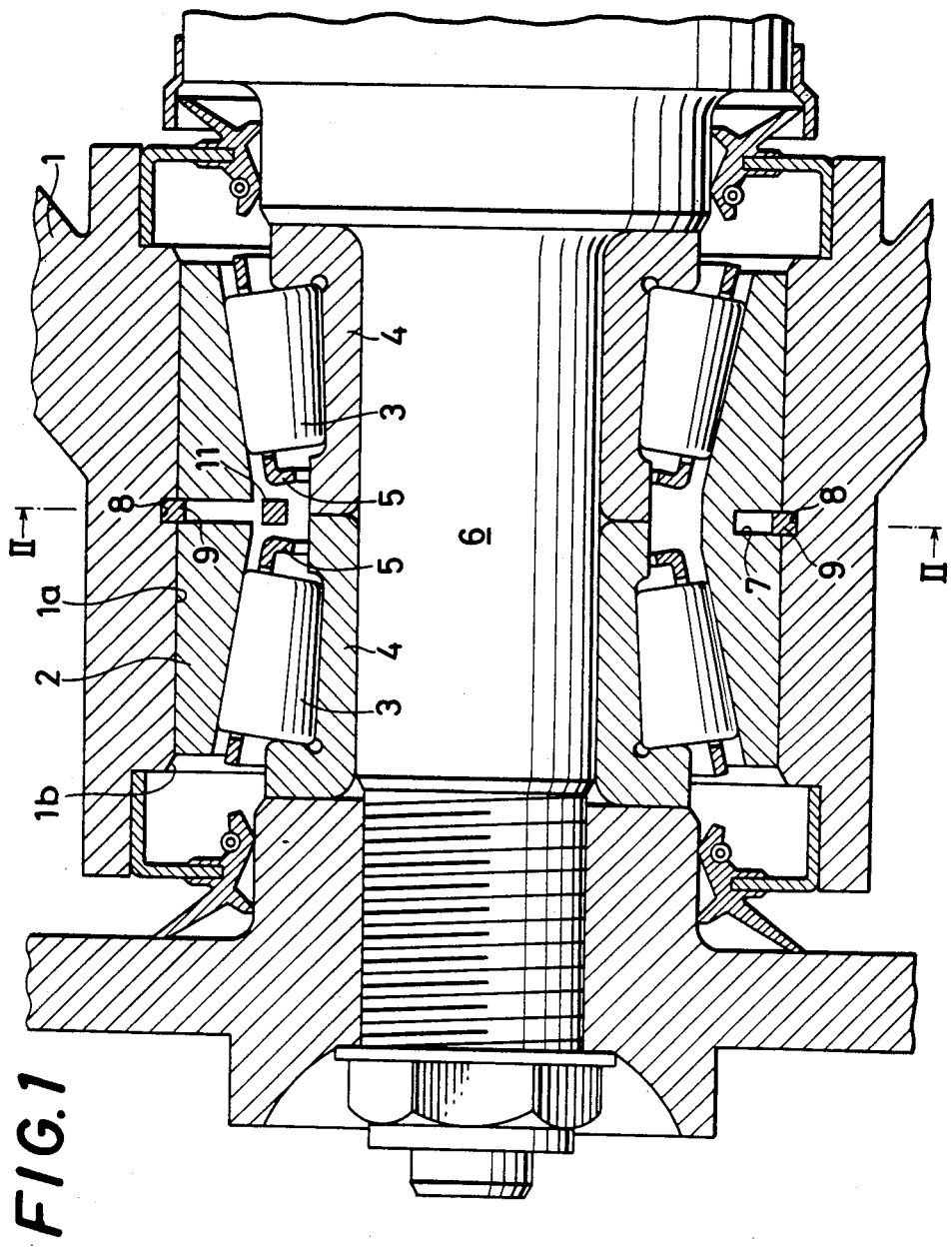
FIG. 1 is a front view in vertical section of a preferred embodiment of the present invention.

The embodiment shown in FIG. 1 is of a device for mounting wheel hub bearings. The mounting device shown comprises a housing 1, its bore 1a, a double cup outer race 2 of a double row taper roller bearing, taper rollers 3, inner races 4 and a retainer 5 for each taper roller. Reference numeral 6 designates an axle tightly set through the inner race 4.

The outer peripheral face off the raceway of the outer race 2 (central zone in the outer periphery of outer race in the embodiment) and the inner peripheral face of housing's bore opposing it have formed therein circumferential grooves 7 and 8 respectively.

The circumferential groove 7 in the outer periphery of the outer race 2 has formed therein at an arbitrary point an opening 10 communicating with the bearing interior.

Figure 2:
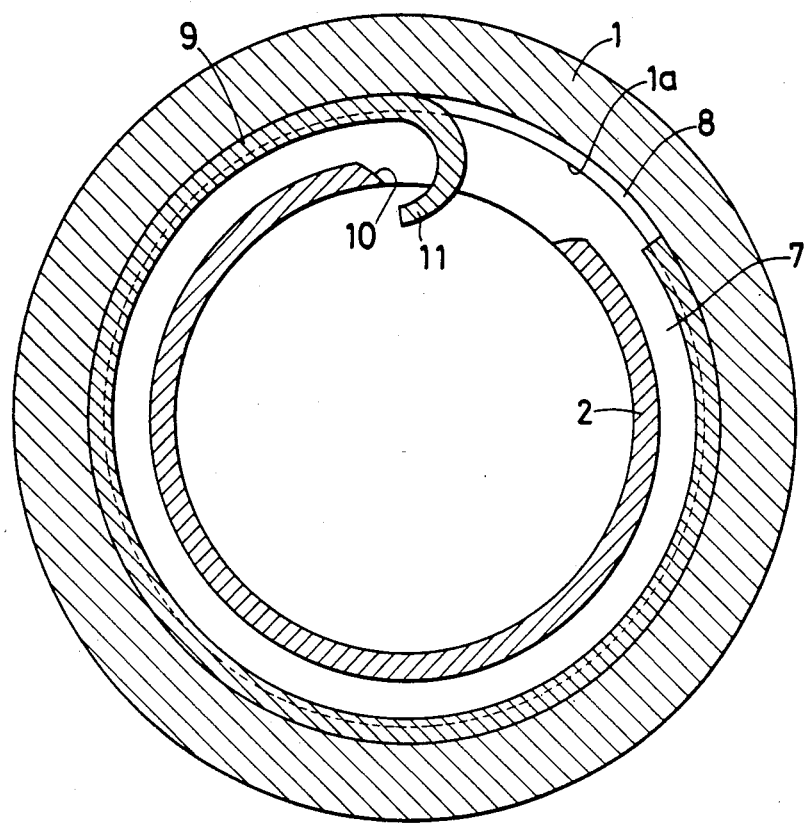
FIG. 2 is a side view in vertical section taken along the line II—II in FIG. 1.

As shown in FIG. 2, there is set a substantially C-sectioned fixing means 9 engaging in both peripheral groove circumferentially along and engaging in both circumferential grooves 7 and 8 with one end 11 thereof bent hookwise toward the inside of the outer race 2, and the hooked end 11 of the fixing means 9 is revealed in the bearing interior through the opening 10 provided in the circumferential groove 7. The fixing means 9 is made of an elastic material and its cross-section is rectangular as shown in FIG. 1. Furthermore, the outer diameter of the fixing means 9 is larger than that of the outer race 2, while its inner diameter is smaller than the outer diameter of the outer race 2, and the radial thickness of the fixing means 9 is dimensioned to enable its embedding in the circumferential groove 7 of the outer race 2.

The sectional shape of the fixing means 9 is not necessarily rectangular and can as well be circular or oval. The material of the fixing means 9 may be anything elastic such as metals, nonmetals, plastics.

Figure 3:
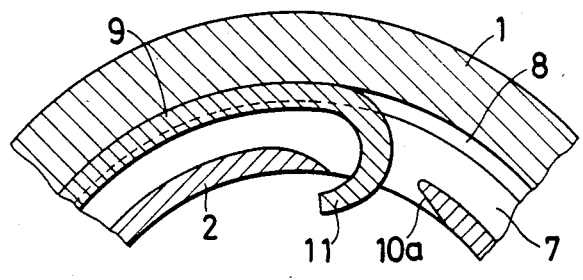
FIG. 3 is a fragmentary side view in vertical section like FIG. 2 of a modified embodiment.

The cross-sectional shape of the opening 10 may, besides being tapered as shown in FIG. 2, be substantially tangential with respect to the inner periphery of the outer race 2 so as to facilitate insertion of the fixing means 9 along the outer race 2, as shown in FIG. 3 as opening 10a.

Figure 4:
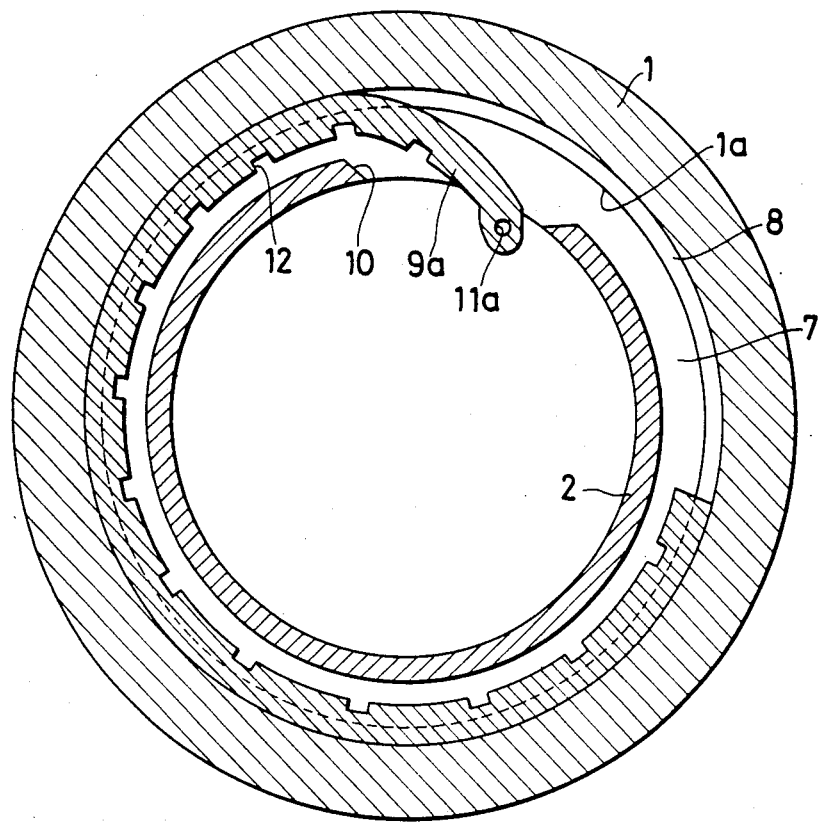
FIG. 4 is a side view in vertical section like FIG. 2 of another example of fixing means.

As shown in FIG. 4, the fixing means 9a may have its radial thickness dimensioned larger than the fixing means 9 of the embodiment shown in FIG. 2 for improvement in rigidity. In order to make the fixing means 9a easily bendable as it is inserted or pulled out of the circumferential groove, the fixing means 9a has a plurality of radial slits or cutouts 12 provided in the inner periphery at equal intervals. One end 11 of the fixing means 9a is bent toward the inside of the outer race and has formed therein a hole 11a for pulling out. It is same as with the embodiment shown in FIGS. 1 and 2 that the end of the fixing means 9a in which the hole 11a is made is caused to reveal in the bearing interior through the opening 10 provided in the bottom of the circumferential groove 7. The hole 11a for pulling out provided at one end of the fixing means 9a is not necessarily a must, and may as well be substituted by hooking the end of the fixing means 9a.

Then, illustrated below is the way of mounting the bearing in the bore of the housing and demounting it therefrom under reference to the embodiment shown in FIGS. 1 through 4.

First described is the way of mounting the bearing in the bore of the housing 1.

Radially elastic fixing means 9 or fixing means 9a is set in advance in the circumferential groove 7 of the outer race 2, and the hooked end 11 or the end having a hole 11a therein is caused to reveal in the bearing interior through the opening 10 or 10a. The outer peripheral portion of the fixing means 9 or 9a is then projecting above the circumferential groove 7 of the outer race 2. When the outer race 2 with the fixing means 9 or 9a set thereon (in the circumferential groove 7 thereof) is then set inside the inner periphery of the housing 1, the fixing means 9 is embedded in the circumferential groove 7 of the outer race 2. The outer race 2 is then further pushed into the housing bore until where the circumferential groove 7 confronts with the circumferential groove 8 in the inner periphery of the housing bore, and thereupon the fixing means 9 or 9a with its radial elasticity engages in the circumferential groove 8. Of course, the inner peripheral portion of the fixing means 9 or 9a is engaged in the circumferential groove 7 of the outer race 2. The outer race 2 is thus automatically mounted fixedly in the bore of the housing.

In order to demount the bearing from the bore of the housing 1, the hook-shaped end of the fixing means 9 or 9a or the hole 11a in one end thereof revealing in the bearing interior through the opening 10 or 10a provided for communication of the circumferential groove 7 of the outer race 2 with the bearing interior is hooked by the aid of a proper tool for the fixing means 9 to be pulled out windingwise, and the outer race 2 is then pulled out of the bore of the housing 1. Since the fixing means 9 or 9a is now pulled out, the outer race 2 is no longer restrained in the housing 1, and can be demounted without any difficulty.

In the embodiment shown FIGS. 1 through 4, the outer peripheral portion of the fixing means 9 or 9a set in the circumferential groove 7 of the outer race 2 is projected above the circumferential groove 7 all along its periphery and the outer race 2 is to be pressed into the bore of the housing 1 in this condition, but since the fixing means 9 or 9a is then freely movable radially in the circumferential groove 7, the extent of projection of the fixing means 9 or 9a beyond the peripheral face of the outer race 2 is not (necessarily) uniform along the periphery. Hence, according to the shape of the chamfered edge 16 of the housing bore 1a, it is possible that the fixing means 9 or 9a is caught by the chamfered edge 16 where the projection of its outer periphery is increased to interfere with proper embedding of the fixing means 9 or 9a in the circumferential groove 7 of the outer race 2.

Figure 5:
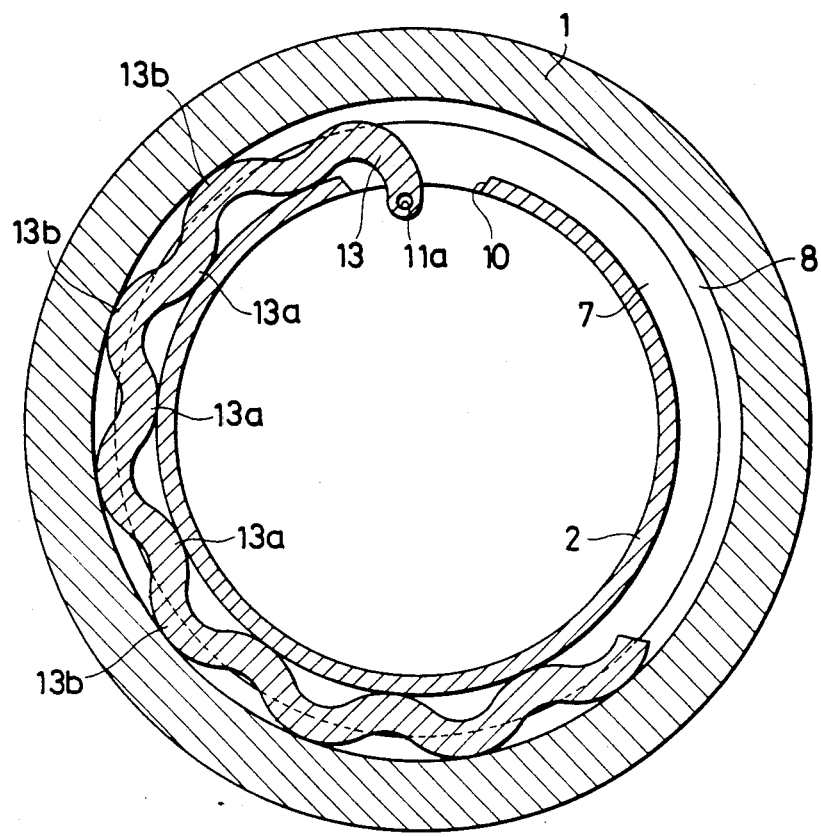
FIG. 5 is a side view in vertical section like FIG. 2 showing still another example of fixing means.

The applicant, therefore, also provides a modified construction as shown in the embodiment of FIG. 5.

Shown in FIG. 4 is a wavy fixing means 13, being an improved alternative of the above fixing means 9. The sectional form of this fixing means 13, too, is rectangular, and is formed wavy along the periphery with its one end bent radially inward of the outer race with a hole for pulling out 11a provided therein. It is the same as in the aforementioned embodiment that one end thereof having the hole 11a therein is revealing inward of the outer race through the opening 10 provided in the bottom of the circumferential groove 7 of the outer race.

The principle of mounting bearing by the fixing means 13 of the aforementioned wavy form is, as is easily understood, that the wavy fixing means alternately crossing the boundary between the circumferential groove 7 of the outer race 2 and the circumferential groove 8 of the housing 1 serves to keep the opposing positions of these circumferential grooves 7 and 8 unaltered.

Figure 7:
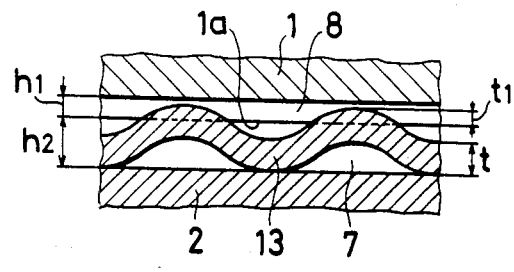
FIG. 7 is a view showing the dimensions of the circumferential grooves in the outer race and the housing as well as the fixing means.

To describe it in greater detail, the individual crests 13a, 13a . . . on the inside of the wavy fixing means 13 come into contact with the bottom of the circumferential groove 7 of the outer race, while the individual crests 13b, 13b . . . on the outside thereof are either in or out of contact with the ceiling of the circumferential groove 8 of the housing 1, the fixing means 13 thus serving the aforementioned engaging function. The dimensional relationships between the fixing means 13 and the circumferential grooves 7 and 8 are as follows as seen from FIG. 7.

With
$h_1$ = Depth of housing's circumferential groove 8
$h_2$ = Depth of outer race's circumferential groove 7
$t$ = Thickness of fixing means 13,
$t_1$ = Extent of projection above outer periphery of outer race of fixing means 13, it is essential that the conditions of $h_2 \geq t$ and $t_1 > 0$ be always be satisfied.

The fixing function is attainable when the relation between $h_1$ and $t$ is
$h_1 > t$,
$h_1 = t$ as well as
$h_1 < t$.
for $h_2 \geq t$ and $t > 0$.

Figure 6:
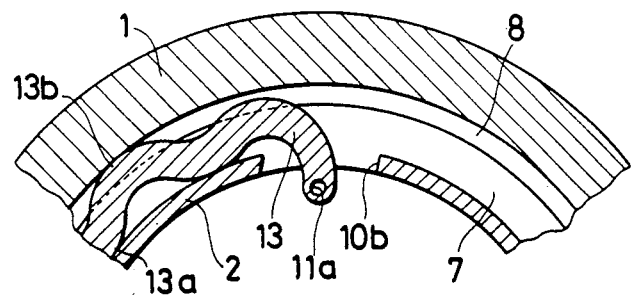
FIG. 6 is a fragmentary side view in vertical section of a modification thereof.

The sectional shape of the opening 10 may, besides those illustrated as 10 and 10a, be as well radially parallel as shown in FIG. 6.

The hole 11 or 11a for pulling out at one end of the fixing means 13 need not be necessarily a hole but may as well be substituted by a hook as shown in FIGS. 1 and 2.

The way of mounting or demounting the bearing in or from the bore of the housing in the embodiment shown in FIG. 5 is the same as in the embodiment shown in FIGS. 1 through 4.

In the case of the fixing means 13, wavy as it is, its multiplicity of crests 13a and 13b on the outside alone are caused to uniformly project beyond the outer periphery of the outer race 2 when it is set in the circumferential groove 7 of the outer race, hence, when the bearing is mounted in the bore 1a of the housing 1, the individual crests 13b, 13b . . . can be embedded easily and securely in the circumferential groove 7 guided by the chamfered edge 1b. There is, therefore, no possibility of the fixing means 13 being caught by the chamfered edge 1b of the housing 1a so as to interfere with embedding of the fixing means 13 in the circumferential groove 7 of the outer race 2, and the bearing can be easily mounted in the bore of the housing 1.

Also positional engagement of the fixing means 13 with the circumferential grooves is feasible even if the thickness of the fixing means t is not large enough to astride both circumferential grooves 7 and 8.

Also, even if the sectional dimensions and elasticity of the fixing means 13 are small, its effect to engage the circumferential grooves 7 and 8 is sufficient if only its shearing stress is ample. It is rather advantageous in that the work is facilitated when the fixing means is pulled out by the aid of a pulling tool in a winding mode in order to take the bearing out of the housing. (Then either or both of the inner race 4 and the rollers 3 are removed to evacuate half the space inside the outer race 2.)

In the embodiments shown in FIGS. 1 through 7 the length of the fixing means 9, 9a or 13 is less than equivalent of the circumference of the circumferential groove 7, but it may generally be enough if its length is more than ½ the circumference.

According to the present invention, it is not that both ends of the outer race are fixed in the housing by means of the snap rings set in the two grooves provided in (the inner periphery of) the bore of the housing respectively as is the case with conventional bearing mounting device, hence no excessive length is required of the housing for forming the grooves for carrying and holding the aforementioned snap rings where corresponding to both ends of the bearing in the housing. Since the work of forming grooves in the bore of the housing for accommodating shoulders or snap rings, the axial length of the housing can be reduced substantially.

The embodiments shown here are all for double row taper roller bearings, but, needless to say, the mounting device of the invention can effectively be applied to other types of bearings such as double row angular ball bearings.

What is claimed is:

1. A bearing mounting device comprising:
   a first circumferential groove provided in the outer peripheral face off the raceway of the outer race of an antifriction bearing;
   a second circumferential groove provided in the inner periphery of a bore of a housing where said bearing is mounted and opposed to said first circumferential groove in the outer periphery of the outer race thereof;
   an opening provided in part of the bottom of said first circumferential groove and communicating with the interior of said outer race;
   an elastic fixing means inserted peripherally into said first and said second circumferential grooves astride both of said grooves and wherein said fixing means has a wavy configuration having an amplitude extending from the bottom of said circumferential groove provided in said outer race to the interior of said circumferential groove provided in said housing; and
   wherein an end portion of said fixing means is revealed inside said outer race through said opening in said first circumferential groove.

2. A bearing mounting device as recited in claim 1, wherein said end portion revealed inside said outer race of said fixing means comprises means permitting said fixing means to be pulled out.

3. A bearing mounting device as recited in claim 1, wherein said fixing means has a length at least more than one-half of the circumference of said first and second circumferential grooves.

4. A bearing mounting device as recited in claim 1, wherein said fixing means is substantially C-sectioned.

* * * * *